(12) United States Patent
Stancu-mara et al.

(10) Patent No.: US 8,572,427 B1
(45) Date of Patent: Oct. 29, 2013

(54) SYSTEMS AND METHODS FOR DETERMINING OPERATIONAL STATES OF NETWORK RESOURCES BASED ON NETWORK USER ACTIVITIES

(75) Inventors: Sorin Stancu-mara, Adliswil (CH); Juro Gottweiss, Adliswil (CH)

(73) Assignee: Google Inc., Mountain View, CA (US)

( * ) Notice: Subject to any disclaimer, the term of this patent is extended or adjusted under 35 U.S.C. 154(b) by 293 days.

(21) Appl. No.: 13/046,052

(22) Filed: Mar. 11, 2011

(51) Int. Cl.
*G06F 11/00* (2006.01)

(52) U.S. Cl.
USPC .......................................................... 714/4.1

(58) Field of Classification Search
None
See application file for complete search history.

(56) References Cited

U.S. PATENT DOCUMENTS 6,918,059 B1 * 7/2005 Galuten et al. .................. 714/31

OTHER PUBLICATIONS

Screen capture from Down for Everyone or Just Me, http://www.downforeveryoneorjustme.com (last visited Mar. 11, 2011) (1 page).
Screen capture from HERDICTWEB, Berkman Center for Internet & Society at Harvard University, http://www.herdict.org/web/ (last visited Mar. 11, 2011) (1 page).
Screen capture from HERDICTWEB, Berkman Center for Internet & Society at Harvard University, http://www.herdict.org/explore/ (last visited Mar. 11, 2011) (2 pages).
Screen capture from HERDICTWEB, Berkman Center for Internet & Society at Harvard University, http://www.herdict.org/participate/ (last visited Mar. 11, 2011) (1 page).
Screen capture from HERDICTWEB, Berkman Center for Internet & Society at Harvard University, http://www.herdict.org/about/ (last visited Mar. 11, 2011) (3 pages).

* cited by examiner

*Primary Examiner* — Amine Riad
(74) *Attorney, Agent, or Firm* — McDonnell Boehnen Hulbert & Berghoff LLP

(57) ABSTRACT

The present application discloses systems, computer readable media, and methods for determining the operational status of network resources based on failed attempts by communications devices to access the network resources. In some embodiments, error messages are analyzed, and status data is associated with hostnames corresponding to network resources based on the analysis. The status data may include status identifiers that indicate the apparent operational states of network resources and geographic accessibility information associated with network resources. Some embodiments may include sending status messages to users and/or network managers based on the status data. Still other embodiments may include sharing the status data with a search engine configured to generate, display, format, and/or rank search results based on the status data.

33 Claims, 7 Drawing Sheets

Article of Manufacture 400

Program Instructions 402

- Receive a plurality of error messages generated by a plurality of communications devices in response to failed attempts by the communications devices to access network resources, wherein each error message in the plurality of error messages includes a respective hostname associated with a particular network resource that a particular communications device failed to access

- Associate status data with individual hostnames included in the plurality of error messages, wherein the status data associated with an individual hostname is based at least in part on how many of the error messages include the individual hostname within a defined time period, and wherein the status data includes a status identifier that indicates an operational state of the network resource associated with the individual hostname

- Store the status data associated with the individual hostnames in a status database

- Receive an additional error message generated by a communications device in response to a failed attempt by the communications device to access a network resource, wherein the additional error message includes a hostname associated with the network resource that the communications device failed to access

- Retrieve from the status database status data associated with the hostname included in the additional error message

- Transmit a status message in response to the additional error message, wherein the status message includes the status data retrieved from the status database Computer Readable Medium 403

Computer Recordable Medium 404

FIG. 11

SYSTEMS AND METHODS FOR DETERMINING OPERATIONAL STATES OF NETWORK RESOURCES BASED ON NETWORK USER ACTIVITIES

BACKGROUND

At any point in time, many millions of people may be using many millions of communications devices to access network resources to obtain information and/or entertainment services from locations all around the world. Most of the time, communications devices are able to successfully access desired network resources to obtain desired information and/or entertainment services without incident.

Sometimes, however, a communications device may be unable to access a desired network resource. There may be many different reasons why a communications device may not be able to access a desired network resource. For example, sometimes network problems may prevent a communications device from connecting to the desired network resource. Some network problems may be local to a particular user, while other network problems may affect many different users. Sometimes a problem associated with the actual desired network resource may prevent a communications device from connecting to the network resource. For example, the network resource may be "down" or otherwise non-operational (or at least less than fully operational) because of hardware, software, and/or local network problems affecting the network resource.

In situations where a particular communications device may be unable to access a desired network resource, the user of the communications device may change configuration settings on the communications device, restart the network connections, restart the communications device, or perform other steps in an attempt to make the communications device connect to the desired network resource. But in some situations, the reason or reasons why the user's communications device may be unable to access the desired network resource may be entirely beyond the user's control.

If a user knew when the reasons for a failed connection attempt were beyond the user's control, then the user might not waste time and effort trying to connect to the desired network resource after the first failed attempt. However, it may be very difficult if not impossible for the user to determine whether the problem or problems that may be preventing access to the desired network resource are beyond the user's control, in part because of the decentralized nature of the management and operations of network resources in the public Internet.

SUMMARY

The present application discloses systems, articles of manufacture, and methods for determining the operational status of network resources based on failed attempts by multiple communications devices to access the network resources. The network resources may correspond to Internet websites, network-based video services, network-based music services, network-based gaming services, or other similar network-based services.

Some embodiments may include receiving and analyzing a plurality of error messages generated by a plurality of communications devices. The plurality of communications devices may have generated the plurality of error messages in response to failed attempts by the communications devices to access network resources. Individual error messages may include a hostname associated with a network resource that a communications device failed to access.

In some embodiments, status data may be associated with hostnames included in the plurality of error messages. The status data may include a status identifier or, in some embodiments, both a status identifier and geographic accessibility information. The status data associated with a particular hostname may be based at least in part on how many of the error messages that include the particular hostname that are received from multiple communications devices during a defined time period. The status identifier may indicate an apparent operational state of the network resource associated with the hostname included in the error messages. Some embodiments may also include storing the status data (including the status identifier) associated with the hostnames in a status database. The status database may be configured to store a plurality of status identifiers for a corresponding plurality of hostnames.

The individual error messages in some embodiments may further include an error type, an origin associated with the communications device that generated the error message, or a timestamp associated with a time that the communications device generated the error message (or alternatively, a time when the error message was received). In embodiments where individual error messages further include origin information associated with the communications devices that generated the error messages, a determination may be made as to whether a particular failed attempt by a communications device to access a particular network resource was caused by (i) the particular network resource being non-operational (or perhaps not fully operational), or (ii) a network problem unrelated to the operational status of the particular network resource. In these embodiments, the determination may be based on an analysis of the origin information included in the error messages associated with the hostname. In some embodiments, geographic accessibility information in the status data associated with a particular hostname may be determined based on the analysis of the origin information included in the error messages.

Some embodiments may further include initiating the transmission of a status message to a communications device in response to receiving an error message from the communications device. In these embodiments, the status message may include information based on the status identifier associated with the hostname included in the error message received from the communications device. Some embodiments may also include initiating the transmission of a status message to a network manager associated with a particular hostname in response to associating a status identifier with the particular hostname that indicates that the network resource corresponding to the particular hostname appears to be not fully operational.

Some embodiments may also include initiating an electronic analysis of a network resource associated with a particular hostname in response to determining that a network resource corresponding to a particular hostname appears to be not operational (or at least not fully operational). In some embodiments, the network resource may be electronically analyzed prior to associating a status identifier with a particular hostname. In other embodiments, the electronic analysis may occur after a status identifier has already been associated with a particular hostname. In some embodiments, at least a portion of the electronic analysis may be conducted with a web crawler, web bot, web scutter, Internet spider, or other similar application that may be configured to analyze a network resource.

In some embodiments, associating status data with a particular hostname based at least in part on a number of error messages received during a particular time period that include the particular hostname may include comparing the number of received error messages with a threshold number of error messages for the particular hostname for the particular time period. In these embodiments, a first status identifier may be associated with the particular hostname in response to determining that the number of received error messages is less than the threshold, and a second status identifier may be associated with the particular hostname in response to determining that the number of received error messages is greater than or equal to the threshold. The first status identifier may indicate that the network resource corresponding to the particular hostname is operational, and the second status identifier may indicate that the network resource corresponding to the particular hostname appears to be non-operational (or at least not fully operational). In some embodiments, the threshold for a particular hostname for a particular time period may be based on a time of day, historical error rates associated with the particular hostname, the number of errors in a previous time period, an expected number of errors for the time period, a number of expected errors from a geographic region, or some combination thereof.

The status database in some embodiments may be interfaced with a search engine configured to generate search results based at least in part on the status data associated with hostnames stored in the status database. Some embodiments may include receiving a query from the search engine. The query may include at least one hostname. In some embodiments, status data associated with the at least one hostname may be retrieved from the status database and sent to the search engine in response to the query. The search engine may be configured to display search results or format links associated with search results based at least in part on the status data. In some embodiments, the search engine may be configured to link a search result to either an Internet website associated with the search result or a cached version of the search result based at least in part on the status data associated with hostnames stored in the status database.

BRIEF DESCRIPTION OF THE DRAWINGS

FIG. 11 shows an example of an article of manufacture according to some disclosed embodiments.

DETAILED DESCRIPTION

The following detailed description describes various features and functions of the disclosed systems, articles of manufacture, and methods with reference to the accompanying figures. In the figures, similar symbols typically identify similar components, unless context dictates otherwise. The illustrative system and method embodiments described herein are not meant to be limiting. Certain aspects of the disclosed systems, articles of manufacture, and methods may be arranged and combined in a wide variety of different configurations, all of which are contemplated herein.

1. System Architecture Overview

Figure 1:
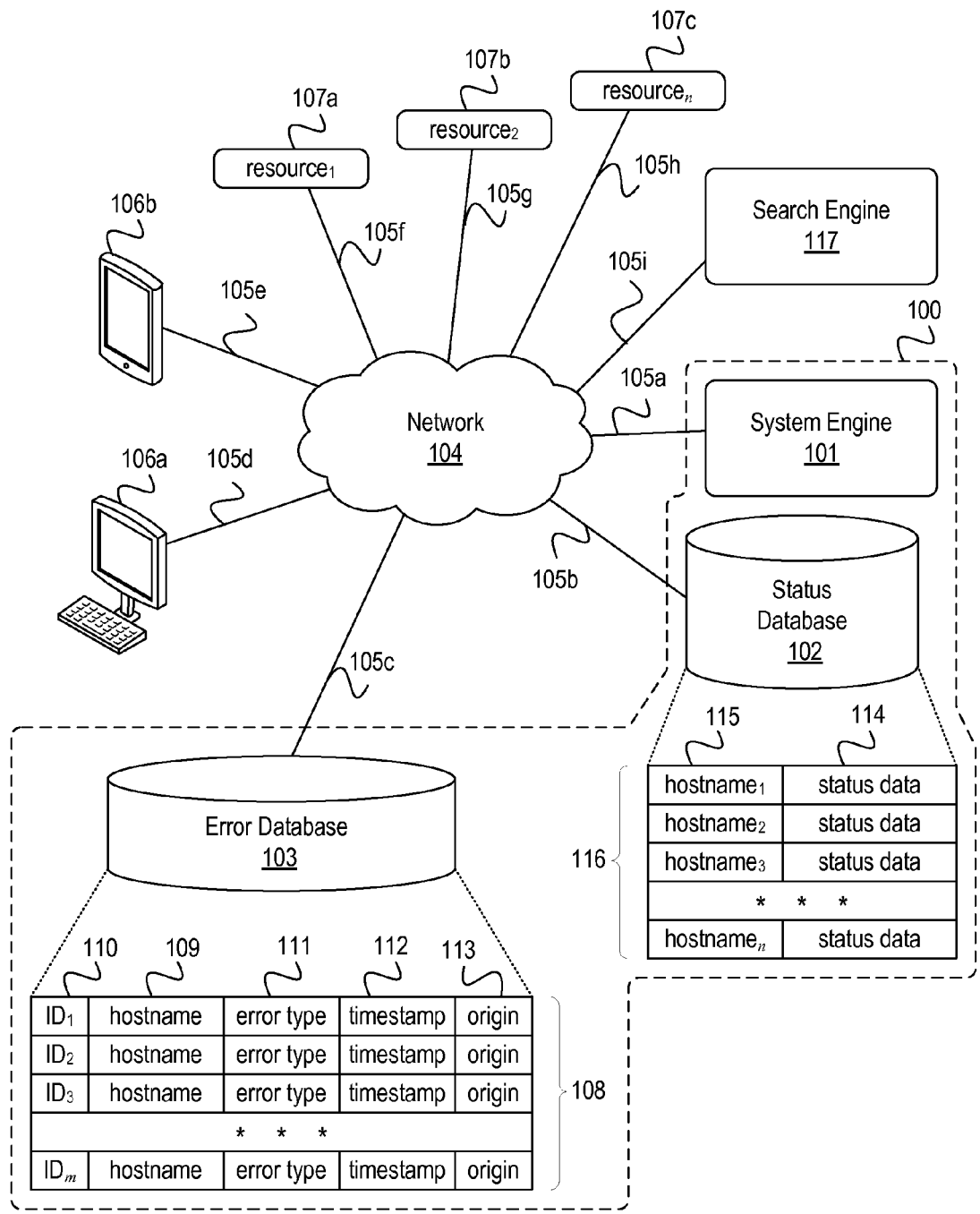
FIG. 1 illustrates certain aspects of one example embodiment of a system configured to determine the operational status of network resources.

FIG. 1 illustrates certain aspects of a system 100 for determining the operational status of network resources according to some embodiments of the disclosed systems, articles of manufacture, and methods. The system 100 may include a system engine 101, a status database 102, and an error database 103. The system engine 101, status database 102, and error database 103 may be communicatively coupled to a network 104 via network links 105a, 105b, and 105c, respectively. In some embodiments, one or more components of the system 100 may additionally be communicatively coupled to a search engine 117 via the network 104. The network 104 may correspond to one or more local area networks, wide area networks, corporate intranets, the public Internet, wireless communications networks, any other type of network configured to provide a communications path between network-enabled computing devices, or any combination thereof.

In some embodiments, the status database 102 and the error database 103 may be separate databases as shown in FIG. 1. In other embodiments, the status database 102 and the error database 103 may be part of the same database. In still other embodiments, the status database 102 and the error database 103 may correspond to portions of different databases.

In operation, network users may use communications devices, such as communications devices 106a or 106b, to access network resources, such as network resources 107a, 107b, or 107c, via the network 104. FIG. 1 shows two communications devices and three network resources for illustrative purposes only. For some embodiments, at any point in time, there may be many millions of different users attempting to access many millions of different network resources via many millions of different communications devices from locations all around the world.

The communications devices may be any type of network-enabled device configured to access data and services via a network, such as a laptop computer, tablet computer, desktop computer, network terminal, mobile computing device, smart phone, media player, television, media terminal, gaming system, etc. As shown in FIG. 1, the communications devices 106a and 106b may be connected to the network 104 via network links 105d and 105e, respectively. The network links 105d and 105e may be any type of wired or wireless network link configured to provide a communications path between the communications devices 106a or 107b and other network resources connected to the network 104.

The network resources 107a, 107b, and 107c may be connected to the network 104 via network links 105f, 105g, and 105h, respectively. The network resources 107a, 107b, and 107c may be any type of network resource that may be accessible via a network, such as, for example, an Internet website, a video service, a music service, a gaming service, or any other time of online network-based information and/or entertainment service. In some embodiments, individual network resources may be associated with a corresponding hostname. In some embodiments, the hostname may be a fully qualified domain name, e.g., www.google.com, mail.google.com, smtp.gmail.com, maps.google.com, www.uspto.gov, etc.

The hostname of the network resource may allow users to access the network resource associated with the hostname by using the network resource's associated hostname instead of a number-based network address, such as, for example, an Internet Protocol (IP) network address. For example, a user may enter a hostname associated with a particular network resource into a user interface running on a communications device to cause the communications device to access the network resource associated with hostname. However, for network resources that may not use a hostname, the system 100 may, in some embodiments, treat the network resource's network address as the network resource's hostname.

In some situations, however, a user may not actually enter a hostname (or other network address or pointer) into a user interface running on the communications device to access a network resource associated with the hostname. Instead, the user, via a user interface running on the communications device, may select a Hyper Text Markup Language (HTML) link (e.g., a text link, an image link, etc.) associated with the hostname. In other situations, the communications device may be configured to access a network resource in response to the user initiating a particular service on the communications device. For example, if the communications device is a media player (e.g., a video or music player), online gaming console, or other similar type of communications device, the communications device may automatically access a particular network resource in response to a user initiating a service via the communications device, e.g., selecting a movie to watch, selecting a song or Internet radio station to listen to, or selecting a game to play. In these embodiments, a user may have limited insight into which hostname the communications device may be using to access a particular network resource at least in part because the communications device may determine the hostname (or other type of network address or pointer) to use for accessing a particular network resource based on a configuration file or other form of software and/or firmware code and with limited user involvement as compared to the cases where the user either enters the hostname into a browser or selects an HTML link in a browser.

After a communications device obtains a hostname associated with a desired network resource, the communications device may then use the hostname to access the network resource. Typically, the communications device may send a lookup request for the hostname to a domain name server (DNS) or similar address lookup system (not shown), and the DNS will respond to the communications device with a network address associated with the hostname. The communications device may then use the network address received from the DNS to access the desired network resource.

Sometimes, however, a communications device may be unable to access a particular network resource. In some embodiments, when a communications device is unable to access a network resource, the communications device (via hardware, software, and/or firmware code) may generate and send an error message to a server system, such as system 100, in response to the failed attempt to access the network resource. In some embodiments, software and/or firmware running on the communications device may generate and send the error message to the system 100. In some embodiments, software associated with an Internet browser running on the communications device may be configured to generate and send the error message in response to the failed access attempt. For example, the functionality to generate and send the error message in response to the failed access attempt may reside in the actual browser software, in a browser toolbar associated with the browser, or in some other application running on the communications device. In some embodiments, the error message may be automatically generated by the communications device (or software/firmware running thereon) in response to the failed access attempt without direct user involvement.

In some embodiments, a communications device may send the error message to the system engine 101, and the system engine 101 may then store the received error message in the error database 103. In alternative embodiments, the communications device may generate and send the error message additionally (or alternatively) to the error database 103 or to a separate server system (not shown) configured to control and/or manage the storage of error messages in the error database 103.

1.1 Error Database

The error database 103 may be configured to store a plurality of error messages 108 received from a plurality of communications devices, such as 106a and 106b, in response to the communications devices' failed attempts to access network resources, such as resources 107a, 107b, and 107c. The term "database" is used here in a general conceptual sense, and the disclosed embodiments are not limited to any particular type of database structure, list structure, index structure, or other data format. In some embodiments, the error database 103 may be configured to store many millions of different error messages received from many millions of different communications devices based on failed attempts to access many millions of network resources from locations all around the world.

Individual error messages in the plurality of error messages 108 stored in the error database 103 may include a hostname 109 associated with a network resource that a communications device was unable to access. For situations where a network resource may use a numeric network address rather than a hostname, the system 100 may treat the network resource's numeric network address as the network resource's hostname. A communications device may insert the hostname into the error message as part of the error message generation process prior to sending the error message. Individual error messages of the plurality of error messages 108 stored in the error database 103 may also optionally have an error message identifier 110 for database organizational purposes.

In addition to a hostname, in some embodiments, the error message may also include an error type identifier 111 corresponding to a type of error that prevented the communications device from successfully accessing the desired network resource. For example, in some circumstances, a communications device may not be able to access a network resource because the DNS (or other lookup system) is unable to find a network address associated with the hostname contained in a hostname lookup request received from the communications device. In such a circumstance, the error message generated by the communications device in response to the failed access attempt may include an error type identifier 111 associated with a DNS error. In other circumstances, a communications device may not be able to access a network resource because of a connection error. A connection error could be caused by one or more physical or logical network problems that prevent the communications device from accessing the desired network resource. In such a circumstance, the error message generated by the communications device in response to the failed access attempt may include an error type identifier 111 associated with a connection error.

In addition to a hostname 109, and optionally an error type 111, an error message in some embodiments may also include a timestamp 112 corresponding to a date and time associated with the failed access attempt. In some embodiments, a communications device may create the timestamp information 112 and insert the timestamp information 112 into the error message as part of the error message generation process prior to sending the error message. In other embodiments, the system 100 may create the timestamp information 112 upon receiving an error message from a communications device. For example, the timestamp information 112 may be created by the system engine 101 or by a controller (not shown) configured to manage the reading and writing of error messages from and to the error database 103.

In some embodiments, an error message may also include origin information 113 associated with the communications device that originated the error message. For example, the origin information 113 may include a network address associated with the communications device, information associated with the communications device's host network, information associated with the geographic location of the communications device, or other information about the originating communications device that may be helpful in analyzing and/or categorizing the error message associated with the failed access attempt. For example, in some embodiments, an error message may also include information that the communications device received in response to a Hypertext Transfer Protocol (HTTP) request.

In some embodiments, the error database 103 may be encoded as computer readable information stored in tangible computer readable media (or computer readable storage media) and accessible by the system engine 101 and/or other computing devices. In some embodiments, the error database 103 may be a single disk drive or other tangible storage media, but in embodiments where a large and scalable system might be advantageous, the error database 103 may be implemented via multiple disk drives or other tangible storage media located at one or more diverse geographic locations as described in more detail herein.

1.2 The System Engine and the Status Database

As described previously, the system engine 101 may be communicatively coupled to the error database 103 and the status database 102 via the network 104. The system engine 101 may include one or more computing devices configured to analyze the plurality of error messages 108 stored in the error database 103, and to associate status data 114 with hostnames 115 corresponding to individual network resources. The system engine 101 may also be configured to store the status data 114 in the status database 102. The term "database" is used here in a general conceptual sense, and the disclosed embodiments are not limited to any particular type of database structure, list structure, index structure, or other data format.

In some embodiments, the status database 102 may be configured to store corresponding status data 114 for a plurality of hostnames 116 corresponding to substantially all of the network resources accessible via the public Internet. In other embodiments, the status database 102 may be configured to store corresponding status data 114 for a plurality of hostnames 116 corresponding to substantially less than all of the network resources that may be accessible via the public Internet. For example, in some embodiments, the status database 102 may be configured to store corresponding status data 114 for a plurality of hostnames 116 corresponding to between a few hundred to several thousand of the more popular network resources available via the public Internet, where the popularity of a particular network resource may be based on: (i) an average number of visitors per time period (hour, day, week, month, year, etc.); (ii) a total number of visitors during a particular time period; (iii) an average amount of traffic per time period; (iv) a total amount of traffic during a particular time period; (v) any other measure of popularity; or (vi) any combination thereof. In some embodiments, companies, organizations, and/or individuals who manage a particular network resource may pay a fee to have the hostname 115 associated with their network resource listed in the status database 102.

The status data 114 associated with a particular hostname 115 in the status database 102 may include a status identifier corresponding to the particular hostname 115. The status identifier may indicate the apparent operational state of the network resource corresponding to the hostname 115. For example, if hostname, is associated with network resource, 107c, then the status identifier (included in the status data 114) corresponding to hostname, may indicate the apparent operational state of network resource, 107c.

In addition to a status identifier, the status data 114 for a particular hostname may also include geographic accessibility information related to the accessibility of a network resource corresponding to the particular hostname. For example, the status data 114 for a particular hostname may include (i) a status identifier to indicate the apparent operational state of the network resource associated with the particular hostname, and (ii) geographic accessibility data to indicate particular geographic regions where communications devices may currently be unable to access the network resource. The geographic accessibility data may be, in some embodiments, based on the origin information 113 in the error messages stored in the error database 103.

In some embodiments, a first status identifier may be used to indicate that a network resource appears to be operational and a second status identifier may be used to indicate that a network resource appears to be non-operational (or at least not fully operational). For example, if the network resource is an Internet website, the hostname corresponding to the Internet website may be associated with the first status identifier (indicating that the Internet website appears to be operational) in situations where the Internet website appears to be "up"—or where a majority of users appear to be able to successfully access the Internet website. Conversely, the hostname corresponding to the Internet website may be associated with the second status identifier (indicating that the Internet website appears to be non-operational) in situations where the Internet website appears to be "down"—or where a majority of users appear to be unable to successfully access the Internet website.

Other embodiments may use more than two status identifiers. For example, some embodiments may use a set of different status identifiers, where individual status identifiers may indicate a corresponding degree to which the network resource is operational. For example, a first status identifier may indicate that the network resource is approximately 100% operational (or substantially operational), a second status identifier may indicate that the network resource is approximately 50% operational, and a third status identifier may indicate that the network resource is approximately 0% operational (or substantially non-operational). Other gradations of operational levels could be used as well, such as, for example, from 0% to 100% operational in: (i) approximately 33.3% increments; (ii) approximately 25% increments; (iii) approximately 10% increments; (iv) approximately 5% increments; or (v) any other gradation.

Different gradations of operational states may be helpful in embodiments where a particular network resource may include a set of multiple server systems configured to provide information and/or entertainment services. In such embodiments, some subset of the multiple servers of the particular network resource may be operational while another subset of the multiple servers may be non-operational because of hardware problems, software problems, network problems, or other issues. When some of the servers are non-operational, the network resource may be only partially operational. As a result, some communications devices may be able to access the network resource while other communications devices may not be able to access the network resource, and thus, the network resource may be partially operational, e.g., approximately 75% operational, approximately 50% operational, etc.

The system engine 101 may use a number of different techniques to associate a particular status identifier with a particular hostname corresponding to a network resource. In some embodiments, the system engine 101 may associate a particular status identifier with a particular hostname based at least in part on the number of error messages that include the hostname and that are received during a particular time period. Because the error database 103 stores the error messages that are generated and sent by various communications devices in response to failed access attempts, the system engine 101 can analyze sets of error messages received during particular time periods that include a particular hostname to determine an apparent operational state of the network resource associated with that particular hostname.

Figure 2:
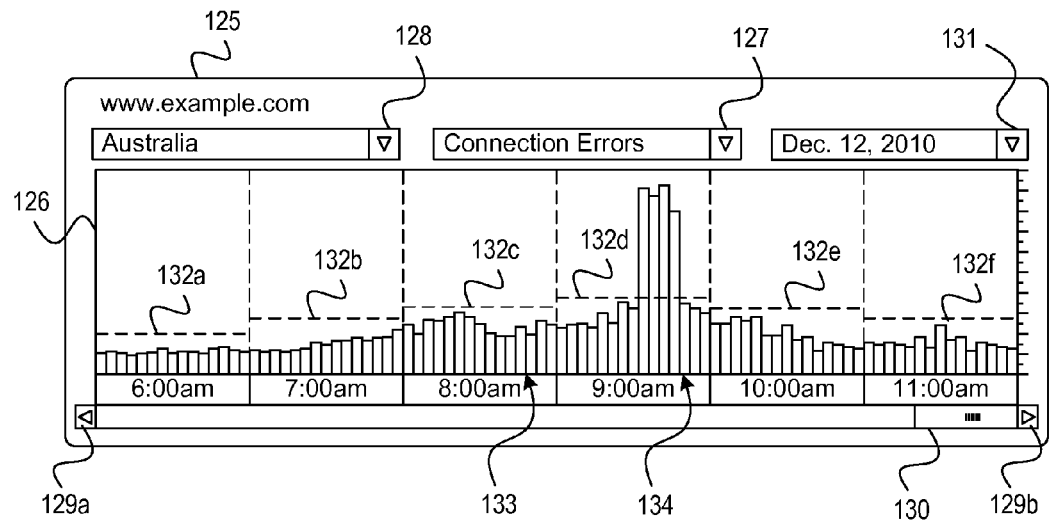
FIG. 2 shows an example of a time series of error messages associated with a network resource received from a plurality of communications devices.

FIG. 2 shows an example user interface 125 that illustrates a time series 126 of connection error messages associated with the hostname www.example.com that may be stored in the error database 103 and analyzed by the system engine 101. In some embodiments, the error database 103 may be configured to store time series similar to time series 126 for up to many millions of different hostnames. The system engine 101 may be configured to analyze the time series 126 of connection error messages associated with the hostname www.example.com to determine an apparent operational state of the network resource corresponding to the www.example.com hostname, and to associate an appropriate status identifier with the www.example.com hostname. The status data 114 corresponding to the www.example.com hostname stored in the status database 102 may include the status identifier.

In the time series 126 of connection error messages shown in FIG. 2, the raw number of connection error messages received during an individual time period is indicated by vertical bars. In time series 126, each one hour timeframe has fifteen bars, and thus, each bar indicates the total number of connection error messages received during a four minute period. In some embodiments, the time series 126 may be displayed in other ways (or not displayed at all), or the time series 126 may be divided into periods that are larger or smaller than four minute increments. For example, in some embodiments, bars could instead be used to display an estimated percentage of users (from 0% to 100%) who experienced a failed access attempt during a particular time period.

In the time series 126 shown in FIG. 2, each connection error received during a given four minute period may correspond to one instance where a communications device failed to access the network resource corresponding to the www.example.com hostname. Thus, higher bars in the time series 126 may indicate a particular four minute period where a greater number of connection error messages were received, and shorter bars in the time series 126 may indicated a particular four minute period where a fewer number of connection error messages were received.

Although the time series 126 shows connection error messages received from communications devices in Australia, a time series for another type of error message (or a combination of error messages) or error messages from a different geographic region could be displayed by using pull down menus 127 and 128, respectively. Similarly, the time series 126 shows the error messages received during a six hour period from 6:00 am to 11:00 am on a particular date, but the error messages received during a different time range or on a different date could be displayed by using scroll buttons 129a and 129b and/or scrollbar 130 to change the time range and/or pull down menu 131 to change the date.

In operation, during any particular time period, some number of communications devices may be unable to access a particular network resource even though the network resource may be operational. In other words, a particular network resource may be operational despite multiple failed access attempts by multiple communications devices. However, if the number of failed access attempts during a particular time period is sufficiently high, then the system 100 may be able to infer that the network resource is non-operational (or at least not fully operational).

In some embodiments, the system engine 101 may be configured to compare the number of error messages that include a particular hostname and that were received during a particular time period with a threshold number of error messages for the particular hostname during the particular time period. For the example shown in FIG. 2, the system engine 101 may be configured to compare the number of connection error messages that include the www.example.com hostname that were received during a particular four minute period with a threshold number of connection error messages for the network resource associated with the www.example.com hostname for the particular four minute period.

The threshold number of error messages may change from hour to hour (e.g., morning, lunch, afternoon, evening) and from day to day (e.g., weekdays versus weekends). Additionally, network resources associated with some hostnames may have threshold error rates that are higher or lower than network resources associated with other hostnames based on the different types of services offered via the different network resources, the different volumes of simultaneous users of the different network resources, or the different types of data transactions performed by the different users of the different network resources, etc.

For the www.example.com hostname, the threshold number of error messages may be illustrated by thresholds 132a-132f. Thresholds 132a-132f may vary from hour to hour and from day to day. For example, threshold 132a associated with the timeframe between 6:00 am and 7:00 am may have a lower threshold number of error messages than threshold 132c associated with the timeframe between 8:00 am and 9:00 am.

After comparing the number of received error messages during a particular time period with a corresponding threshold for the particular time period, the system engine 101 may associate a status identifier with the hostname based on the comparison. In some embodiments, the system engine 101 may (i) associate an "operational" status identifier with the hostname in response to determining that the number of received error messages is less than the threshold number of error messages, or (ii) associate a "non-operational" status identifier with the hostname in response to determining that the number of received error messages is greater than or equal to the threshold number of error messages. In some embodiments, the threshold number of error messages for a particular time period may be based on historical numbers of received error messages for the time period, an expected number of total access attempts during the time period, other estimates for setting error or error rate thresholds, or any combination thereof. In some embodiments, a threshold number of error messages for one geographic region for a particular time period may be different than a threshold number of error messages for another geographic region for the particular time period.

For example, during each four minute period between 8:00 am and 9:00 am, the actual number of received error messages 133 associated with failed attempts to access the network resource corresponding to the www.example.com hostname was less than the threshold 132c for the time periods between 8:00 am to 9:00 am. Therefore, the system engine 101 may have associated the "operational" status identifier with the www.example.com hostname in response to determining that the actual number of received error messages 133 was less than the threshold 132c for the time periods. The "operational" status identifier may indicate that the network resource associated with the www.example.com hostname appears to be operational (i.e., the Internet website at www.example.com appears to be "up").

In some embodiments, if a particular hostname has been associated with the "operational" status identifier during an earlier time period, then the system engine 101 may not need to associate the hostname with the "operational" status identifier again in a later time period in response to determining that the actual number of received error messages was less than the threshold for the later time period. Instead, the system engine 101 may leave the "operational" status identifier associated with the particular hostname unchanged in response to determining that the actual number of received error messages is less than the threshold for the later time period.

Similarly, during approximately sixteen minutes between 9:00 am and 10:00 am, the actual number of error messages 134 associated with failed attempts to access the network resource corresponding to the www.example.com hostname exceeded the threshold 132d for the time periods between 9:00 am to 10:00 am. Therefore, the system engine 101 may have associated the "non-operational" status identifier with the www.example.com hostname in response to determining that the actual number of received error messages 134 was greater than the threshold 132d for one or more of the time periods from 9:00 am to 10:00 am. The "non-operational" status identifier may indicate that the network resource associated with the www.example.com hostname appears to be non-operational (i.e., the Internet website at www.example.com appears to be "down").

When the actual number of received error messages later falls below the error threshold, the system engine 101 may associate the "operational" status identifier with the www.example.com hostname again in response to determining that the actual number of received error messages 134 is less than the threshold 132d for the time periods between 9:00 am to 10:00 am. Thus, in operation, the system engine 101 may be, in some embodiments, configured to determine the apparent operational states for many different network resources and associate corresponding status identifiers with hostnames corresponding to the many different network resources in substantially real time.

Although FIG. 2 shows four minute time periods with error thresholds that change on an hourly basis, the time periods could be other lengths of time, e.g., a few seconds to a few minutes. Similarly, the error thresholds may change at more or less frequent intervals than hourly, e.g., every few minutes to every few hours or days. In some embodiments, the error threshold for some hostnames may remain the same or substantially the same for hours, days, weeks, or months.

In some embodiments, the system engine 101 may additionally or alternatively analyze other aspects of the time series 126 in connection with associating a status identifier with a particular hostname. For example, the system engine may associate a status identifier with a particular hostname based on: (i) a change from a first number of error messages received during a first time period (or first set of time periods) to a second number of error messages received during a second time period (or second set of time periods); (ii) a rate of change in the number of error messages received over time; (iii) a rate of change in the number of error message received over time compared to a historical rate of change in the number of received error messages; and/or (iv) other error metrics or error rate metrics that may be helpful in inferring an apparent operational state of a network resource.

In some embodiments, the system engine 101 may be configured to analyze the network resource associated with a particular hostname in response to determining that the network resource appears to be not fully operational. In other embodiments, the system engine 101 may be configured to initiate an analysis of the network resource in response to determining that the network resource appears to be not fully operational. In some embodiments, the analysis of the website may be conducted with a web crawler, web bot, web scutter, Internet spider, or other similar application that may be configured to analyze a particular network resource. In some embodiments, the system engine 101 may analyze (or initiate an analysis of) the network resource corresponding to a particular hostname in response to determining that an actual number of error messages exceeds a threshold number of messages, and then associate a status identifier with the hostname associated with the network resource based at least in part on the results of the analysis.

Initiating a web crawler or similar application to analyze the network resource may enable the system engine 101 to confirm whether the network resource is operational or non-operational. For example, if the web crawler application is able to analyze the network resource associated with a particular hostname even though the system 100 may have received many error messages associated with the hostname, the system engine 101 may be able to infer that the network resource is still operational despite the fact that many users may be experiencing problems associated with the network resource. But if the web crawler application is unable to analyze the network resource, then the system engine 101 may be able to infer (or perhaps confirm) that the network resource is not operational.

In embodiments where the status data 114 for a particular hostname may also include geographic accessibility information, the system 100 may also be configured to show geographic regions where communications devices may be unable to access a network resource associated with a particular hostname. As described previously, the geographic accessibility data may be based on the origin information 113 for the plurality of error messages stored in the error database 103.

Figure 3:
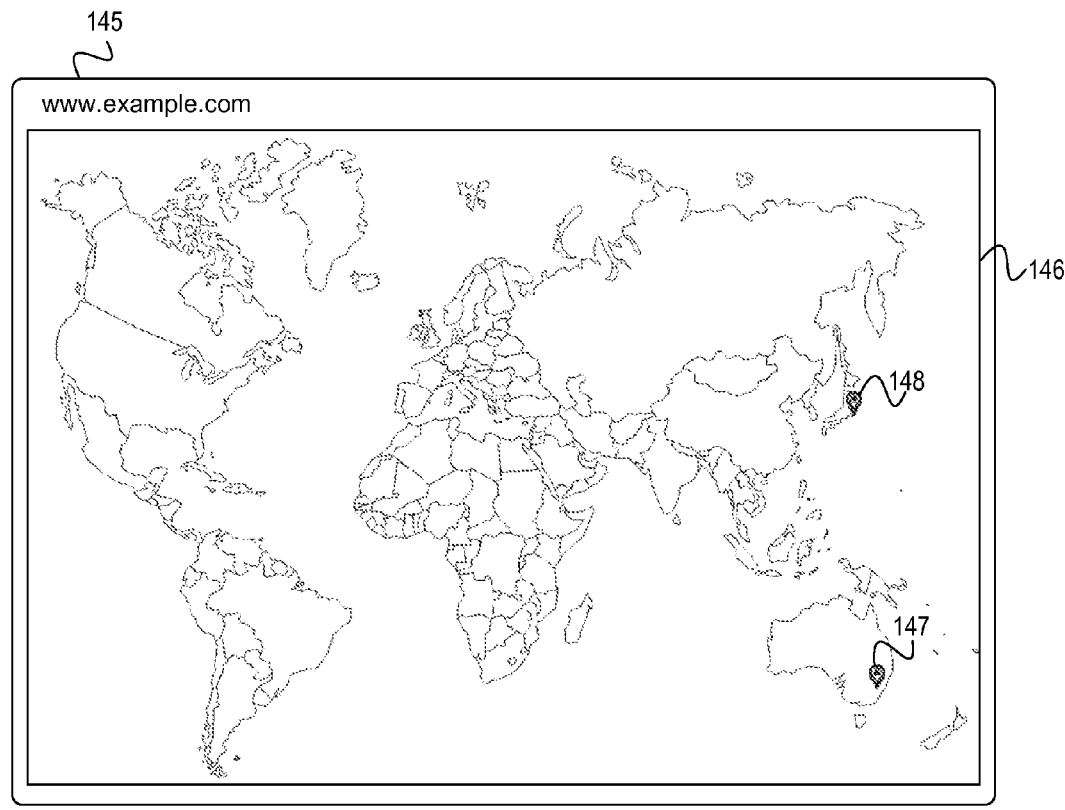
FIG. 3 shows an example of a map illustrating geographic regions where communications devices may have been unable to access a particular network resource.

FIG. 3 shows an example user interface 145 that illustrates geographic locations where communications devices are expected to be unable to access the network resource associated with the www.example.com hostname. Window 146 illustrates a map of the world. Icon 147 may indicate that users located in Australia are presently unable to access the network resource associated with the www.example.com hostname. Similarly, icon 148 may indicated that users located in Japan are also presently unable to access the network resource associated with the www.example.com hostname.

Although FIG. 3 shows user connection problems based on particular countries, the origin data 113 associated with the error messages in the error database 103 could also be used to determine whether users in smaller geographic regions (e.g., sub-divisions of countries, states, counties, cities, etc.) or users associated with various service providers may be unable to access a particular network resource corresponding to a hostname. By analyzing the origin data 113 associated with the error messages in the error database 103, the system engine 101 may be able to determine geographic accessibility information for a network resource corresponding to a particular hostname.

In some embodiments, the geographic accessibility information may be used to determine whether problems that may be causing failed access attempts are affecting all users or some subset of users. For example, if enough error messages are received from a wide variety of geographic locations, the system engine 101 may be able to infer that the network resource is probably not operational. But if a high enough percentage of the total number of error messages for a particular hostname are received from a specific geographic location (or locations), then the system engine 101 may be able to infer that the network resource is probably operational, but that some other network problem is causing users in the specific geographic location (or locations) to experience failed access attempts.

1.3 Applications for Using the Status Data

The status data 114 (including the status identifiers) may be used in a variety of ways to provide information to network users and network managers based on the operational status of various network resources.

In some embodiments, the system engine 101 or a separate messaging system (not shown) may be configured to send a status message to a communications device in response to the system 100 receiving an error message from the communications device. The status message may include some of the status data 114 associated with the hostname appearing in the error message, such as the status identifier and/or geographic accessibility information. In some embodiments, the status message may inform the user of the communications device that originated the error message that the network resource that the communications device failed to access appears to be operational, non-operational, partially operational, or perhaps operational but not accessible by communications devices in the user's geographic area (or perhaps not accessible by communications devices attempting to access the network resource from a particular service provider network).

For example, the status message may inform the user that the desired network resource is currently non-operational and that additional attempts to access the network resource in the near term might be unproductive. The status message may alternatively inform the user that the desired network resource is currently operational, but that other network problems appear to be preventing users in a particular geographic region from successfully accessing the network resource. The status message may still alternatively inform the user that the network resource appears to be partially operational, and that an additional attempt to access the network resource in the near term might be productive.

In some embodiments, a follow-up status message could be sent to a user who previously received a status message indicating that a desired network resource was non-operational. The follow-up status message could inform the user that the desired network resource appears to be operational again. For situations where a prior status message may have indicated that the desired network resource appears to be operational but that other network problems may be preventing the communications device from accessing the desired network resource, the follow-up status message may be sent to the communications device in response to determining that the number of received error messages has fallen below a threshold. In such a situation, the follow-up status message may indicate that a recent decrease in received error messages suggests that the problem that may have previously prevented the communications device from accessing the desired network resource appears to have been resolved.

In some embodiments, the system engine 101 may be configured to access another database (not shown) that may include information related to one or more network managers associated with various individual network resources. In some embodiments, the system engine 101 may be further configured to send a status message to one or more network managers associated with a particular network resource in response to determining that the network resource appears to be not fully operational. The status message sent to the network manager may be an email, a text message, an automated phone call, or any similar type of message.

For example, with reference to FIG. 2, after the system engine 101 associated the "non-operational" status identifier with the www.example.com hostname in response to determining that the actual number of received error messages 134 was greater than the threshold 132*d* for time periods between 9:00 am to 10:00 am, the system engine 101 may then send a status message to a network manager associated with the www.example.com hostname to inform the network manager that the system 100 has received information to suggest that the network resource corresponding to the www.example.com hostname is currently non-operational (or at least not fully operational).

Similarly, in some embodiments, the system engine 101 may be configured to later send a follow-up status message to the network manager in response to determining that a network resource appears to be operational again. For example, with reference to FIG. 2 again, the system engine 101 may be configured to send a follow-up status message to the network manager in response to determining that the actual number of received error messages 134 has fallen below the threshold 132*d* for time periods between 9:00 am to 10:00 am. The follow-up message may inform the network manager that the system 100 has received information to suggest that the network resource corresponding to the www.example.com hostname is operational once again.

In some embodiments, a search engine 117 may be granted access or otherwise interfaced to the status database 102. By interfacing the search engine 117 to the status database 102, the search engine 117 may be configured to use the status data 114 (including the status identifiers and the geographic accessibility information) associated with hostnames 115 in the status database 102 to generate, rank, display, format, or otherwise tailor search results in response to a particular search query.

In some embodiments, the search engine 117 may generate a list of search results in response to a search query from a user. The search engine 117 may then generate a separate query of its own to send to the system 100. The query that the search engine 117 sends to the system 100 may include at least one hostname. The hostname may correspond to one of the search results generated by the search engine 117 in response to the user query.

In response to receiving the query from the search engine 117, the system 100 may access the status database 102 to retrieve status data 114 associated with the hostname included in the query from the from search engine 114. The system 100 may then send the retrieved status data 114 to the search engine 117 in response to the query from the search engine 117. The search engine 117 may be configured to use the status data 114 to generate, rank, display, format, or otherwise tailor the search results that the search engine 117 generated in response to the original user query.

For example, the search engine 117 may be configured to annotate search results based on the status data 114 associated with the hostnames 115 in the status database 102. In some embodiments, the search engine 117 may use the status identifiers to indicate particular Internet websites in a set of search results that appear to be non-operational (or at least not fully operational). Additionally or alternatively, the search engine 117 may be configured to format or structure its search results so that a user who selects a search result associated with a non-operational (or not fully operational) Internet website might be linked to a cached version of the Internet website instead of being linked to the actual Internet website at the network resource. The search engine 117 may, in some embodiments, be configured to exclude certain non-operational (or not fully operational) Internet websites from a listing of search results. In other embodiments, the search engine 117 may be configured to rank search results associated with operational Internet websites higher than search results associated with less than fully operational Internet websites.

In some embodiments, the search engine 117 may be configured to use the status identifiers in combination with the geographic accessibility data for a particular hostname to generate, rank, display, format, or otherwise tailor search results in response to a particular search query based on the origin of the query. For example, in some embodiments, the search engine 117 may use the status identifiers and the geographic accessibility data to indicate particular Internet websites in a set of search results that may currently be either (i) non-operational (or at least not fully operational) and/or (ii) unreachable from the location of the communications device that submitted the query. Additionally or alternatively, the search engine 117 may be configured to format or structure its search results so that a user who selects a search result associated with a non-operational (or not fully operational) or unreachable Internet website might be linked to a cached version of the Internet website instead of being linked to the actual Internet website at the network resource. The search engine 117 may, in some embodiments, be configured to exclude certain non-operational (or not fully operational) or unreachable Internet websites from a listing of search results. In other embodiments, the search engine 117 may be configured to rank search results associated with operational and reachable Internet websites higher than search results associated with non-operational, not fully operational, or unreachable Internet websites.

2. Computing Device Architecture

Figure 4:
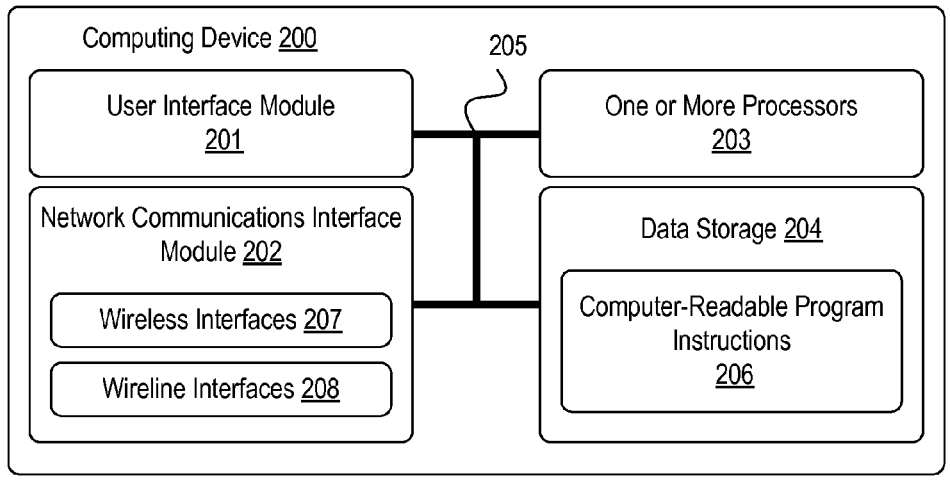
FIG. 4 shows an example of one type of computing device that may be used in some embodiments of the system engine and/or the search engine shown in FIG. 1A.

FIG. 4 is a block diagram of an example of a computing device 200 that may be configured to perform one or more functions of the system engine 101 and/or the search engine 117. The computing device 200 may include a user interface module 201, a network-communication interface module 202, one or more processors 203, and data storage 204, all of which may be linked together via a system bus, network, or other connection mechanism 205.

The user interface module 201 may be operable to send data to and/or receive data from external user input/output devices. For example, the user interface module 201 may be configured to send/receive data to/from user input devices such as a keyboard, a keypad, a touch screen, a computer mouse, a track ball, a joystick, and/or other similar devices, now known or later developed. The user interface module 201 may also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 201 may also be configured to generate audible output(s), such as a speaker, speaker jack, audio output port, audio output device, earphones, and/or other similar devices, now known or later developed.

The network-communications interface module 202 may include one or more wireless interfaces 207 and/or wireline interfaces 208 that may be configurable to communicate via a network, such as the network 104 shown in FIG. 1. The wireless interfaces 207 may include one or more wireless transceivers, such as a Bluetooth transceiver, a Wi-Fi transceiver, a WiMAX transceiver, and/or other similar type of wireless transceiver configurable to communicate via a wireless network. The wireline interfaces 208 may include one or more wireline transceivers, such as an Ethernet transceiver, a Universal Serial Bus (USB) transceiver, or similar transceiver configurable to communicate via a twisted pair wire, a coaxial cable, a fiber-optic link or a similar physical connection to a wireline network.

In some embodiments, the network communications interface module 202 may be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications may be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms may be used as well or in addition to those listed herein to secure (and then decrypt/decode) communications.

The one or more processors 203 may include one or more general purpose processors (e.g., microprocessors manufactured by Intel, Advanced Micro Devices, or similar manufacturers) and/or one or more special purpose processors (e.g., digital signal processors, application specific integrated circuits, etc.). The one or more processors 203 may be configured to execute computer-readable program instructions 206 that may be contained in the data storage 204 and/or other instructions as described herein.

The data storage 204 may include one or more computer-readable storage media that may be read or accessed by at least one of the processors 203. The one or more computer-readable storage media may include volatile and/or non-volatile storage components, such as optical, magnetic, organic or other memory or disc storage, which may be integrated in whole or in part with at least one of the processors 203. In some embodiments, the data storage 204 may be implemented using a single physical device (e.g., one optical, magnetic, organic or other memory or disc storage unit), while in other embodiments, the data storage 204 may be implemented using two or more physical devices.

The data storage 204 may include computer-readable program instructions 206 and perhaps additional data. In some embodiments, the data storage 204 may additionally include storage required to perform at least part of the herein-described techniques and/or at least part of the functionality of the herein-described devices and networks.

4. Scalable System Architecture

The system engine 101 may include one or more computing devices 200 configured to analyze the plurality of error messages 108 stored in the error database 103, and to associate status data 114 with hostnames 115 corresponding to individual network resources. Additionally, the search engine 117 may include one or more computing devices 200 configured to interface with the system 100 and to generate, annotate, rank, and/or display, etc. search results based at least in part on the status data 114 stored in the status database 102.

In some embodiments, the system engine 101 may be a single computing device 200 residing in a single computing center, or in some embodiments, the system engine 101 may include multiple computing devices similar to computing device 200. In some embodiments where the system engine 101 may include multiple computing devices, all the computing devices may be located in a single computing center. In other embodiments, the multiple computing devices of the system engine 101 may be located in multiple diverse geographic locations as described herein. Similarly, the search engine 117 may also include multiple computing devices similar to computing device 200, and the multiple computing devices of the search engine 117 may be located in multiple diverse geographic locations as described herein. Although the present disclosure focuses on the scalability of the system 100, the search engine 117 in some embodiments may also be scaled in a fashion similar to the manner described with respect to the system 100 shown in FIG. 1.

Figure 5:
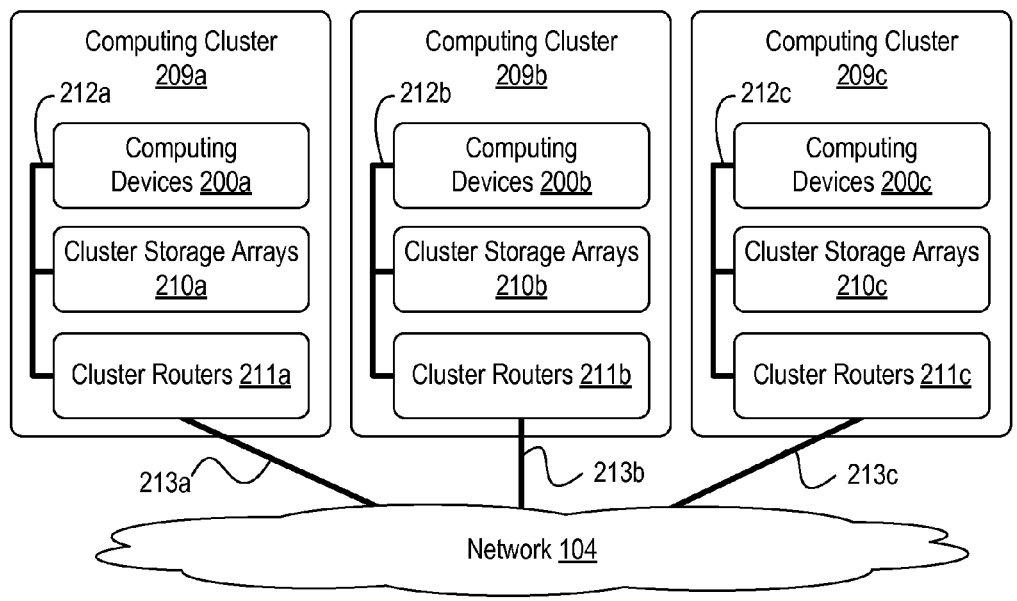
FIG. 5 shows an example of a scalable system architecture including a plurality of computing devices, storage arrays, and network routers that may be used in some embodiments of the system engine and/or the search engine shown in FIG. 1A.

FIG. 5 shows one embodiment of a system 100 (and/or search engine 117) that may include three computing clusters 209a, 209b, and 208c. The computing cluster 209a may include multiple computing devices 200a, multiple cluster storage arrays 210a, and multiple cluster routers 211a connected by a local cluster network 212a. Similarly, the computing cluster 209b may include multiple computing devices 200b, multiple cluster storage arrays 210b, and multiple cluster routers 211b connected by a local cluster network 212b. Likewise, the computing cluster 209c may include multiple computing devices 200c, multiple cluster storage arrays 210c, and multiple cluster routers 211c connected by a local cluster network 212c.

In some embodiments, each of the computing clusters 209a, 209b, and 209c may have an equal number of computing devices, an equal number of cluster storage arrays, and an equal number of cluster routers. In other embodiments, however, each computing cluster may have different numbers of computing devices, different numbers of cluster storage arrays, and different numbers of cluster routers. The number of computing devices, cluster storage arrays, and cluster routers in each computing cluster may depend on the computing task or tasks assigned to each computing cluster.

In computing cluster 209a, for example, the multiple computing devices 200a may be configured to perform various computing tasks of the system engine 101 and/or the search engine 117 shown and described with respect to FIGS. 1-3. In some embodiments, the various functionalities of the system engine 101 may be distributed among the multiple computing devices 200a. For example, some computing devices may be configured to access and analyze the error messages contained in the error log database 103. Other computing devices may be configured to associate status identifiers with hostnames, and to store the status identifiers into the status database 102. Still other computing devices may be configured to send status messages to network users and/or network managers, while other computing devices may be configured to manage search engine 117 access to the status database 102. Computing devices 200b and 200c in computing clusters 209b and 209c may be configured similarly to computing devices 200a in computing cluster 209a.

In some embodiments, computing devices 200a in computing cluster 209a may be configured to perform one or more functions of the system engine 101, computing devices 200b in computing cluster 209b may be configured to perform one or more other functions of the system 101, and computing devices 200c in computing cluster 209c may be configured to perform still one or more different functions of the system engine 101. The computing functions of the search 117 may be similarly distributed across multiple computing clusters in a similar fashion.

For example, computing devices 200a in computing cluster 209a may be configured to access and analyze the error messages in the error database 103. Computing devices 200b in computing cluster 209b may be configured to associate status identifiers with hostnames and to store the status identifiers associated with the hostnames into the status database 102. And computing devices 200c in computing cluster 209c may be configured to manage the interface between the search engine 117 and the status database 102.

In some embodiments, computing tasks for the system engine 101 may be distributed across the multiple computing devices 200a, 200b, and 200c in computing clusters 209a, 209b, and 209c based at least in part on the processing requirements of the different system engine 101 functions, the processing capabilities of the computing devices that comprise the system engine 101, the latency of the network links between the computing devices in each computing cluster and between the computing clusters themselves, and/or other factors that may contribute to the cost, speed, fault-tolerance, resiliency, efficiency and/or other design goals of the system 100. The distribution of computing tasks for the search engine 117 may be distributed across multiple computing clusters based on similar considerations.

The cluster storage arrays 210a, 210b, and 210c of the computing clusters 209a, 209b, and 209c may be data storage arrays that include disk array controllers configured to manage read and write access to groups of hard disk drives. The disk array controllers, alone or in conjunction with the system engine 101, may also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of the system engine 101 can be distributed across the computing devices 200a, 200b, and 200c of computing clusters 209a, 209b, and 209c, various active portions and/or backup/redundant portions of the error database 103, the status database 102, and/or other databases that may be used by the system 100 may be distributed across the multiple cluster storage arrays 210a, 210b, and 210c of computing clusters 209a, 209b, and 209c. For example some cluster storage arrays may be configured to store portions of the error database 103, some cluster storage arrays may be configured to store backup versions of the error database 103, and some cluster storage arrays may be configured to store the status database 102 and/or backup/redundant versions of the status database 102.

In some embodiments, the data in the error database 103 and the status database 102 may be distributed across the multiple cluster storage arrays 210a, 210b, and 210c in computing clusters 209a, 209b, and 209c based at least in part on the data storage requirements of the status database 102 and the error database 103, the data storage and data access speed of the cluster storage arrays, the latency of the network links between the computing devices in each computing cluster and between the computing clusters themselves, and/or other factors that may contribute to the cost, speed, fault-tolerance, resiliency, efficiency and/or other design goals of the system 100.

The cluster routers 211a, 211b, and 211c in computing clusters 209a, 209b, and 209c may include networking equipment configured to provide internal and external communications for the computing clusters. For example, the cluster routers 211a in computing cluster 209a may include one or more internet switching and/or routing devices configured to provide (i) local area network communications between the computing devices 200a and the cluster storage arrays 201a via the local cluster network 212a, and (ii) wide area network communications between the computing cluster 209a and the computing clusters 209b and 209c via the wide area network connection 213a to network 104. Cluster routers 211b and 211c can include network equipment similar to the cluster routers 211a, and cluster routers 211b and 211c can perform similar networking functions for computing clusters 209b and 209b that cluster routers 211a perform for computing cluster 209a.

In some embodiments, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of local networks 212a, 212b, 212c, the latency, throughput, and cost of wide area network links 213a, 213b, and 213c, and/or other factors that may contribute to the cost, speed, fault-tolerance, resiliency, efficiency and/or other design goals of the system 100.

5. Algorithms, Methods, and Processes

FIGS. 6A-6C and 7-10 show examples of methods and algorithms according to some embodiments of the disclosed systems, articles of manufacture, and methods. For the processes and methods disclosed herein, the flowcharts show functionality and operation of one possible implementation of the disclosed embodiments. In this regard, each block may represent a module, a segment, or a portion of program code, which may include one or more instructions executable by a processor for implementing specific logical functions, actions, or steps in the method. The program code may be stored on any type of computer readable medium such as a storage device including a disk or hard drive or other storage medium. The computer readable medium may also include non-transitory computer readable media such as computer-readable media that stores data for short periods of time such as register memory, processor cache, and Random Access Memory (RAM). The computer readable media may also include non-transitory media, such as secondary or persistent long term storage, such as read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Additionally, each functional block in the disclosed methods may represent circuitry that can be configured to perform the specific logical functions in the process. Alternative implementations are included within the scope of the example embodiments of the present disclosure in which functions may be executed out of order from that shown or described, including substantially concurrent or in reverse order, depending on the functionality involved, as would be understood by those reasonably skilled in the art.

Figure 6A:
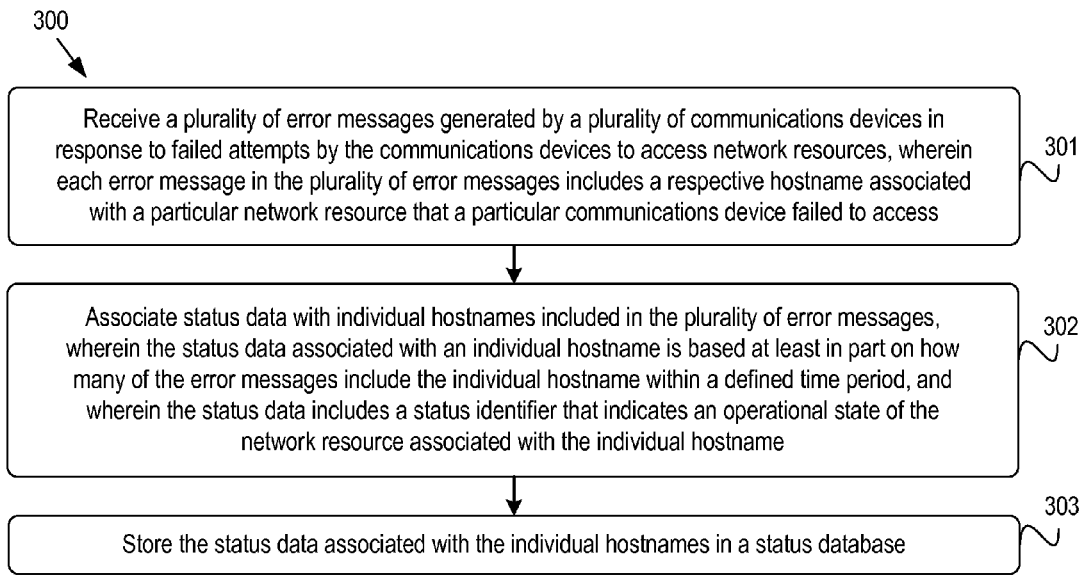
FIGS. 6A-6C and 7-10 show examples of methods and algorithms according to some embodiments of the disclosed systems, articles of manufacture, and methods.

FIG. 6A illustrates a method 300 for associating status data with a hostname that may be performed by some embodiments of system 100 shown and described with respect to FIGS. 1-3.

At block 301, a plurality of error messages may be received. The error messages may have been generated by a plurality of communications devices in response to failed attempts by the communications devices to access network resources, such as Internet websites, network-based video services, network-based music services, network-based gaming services, or other similar online or network-based information and/or entertainment services.

Each error message in the plurality of error messages may include a respective hostname associated with a particular network resource that a particular communications device failed to access. In operation, the error messages may be substantially similar to the error messages shown and described with respect to FIGS. 1-3. For example, the error messages may also include an error type, an origin associated with the communications device that generated the error message, and/or a timestamp associated with a time that the communications device generated the error message.

At block 302, status data may be associated with individual hostnames included in the plurality of error messages. The status data may include a status identifier. The status data in some embodiments may include a status identifier and geographic accessibility information. The association of the status data with an individual hostname may be based at least in part on how many of the error messages include the individual hostname that are received during a defined time period.

The status identifier included the status data may correspond to an apparent operational state of the network resource associated with the individual hostname. In operation, the status identifiers, and the association of a status identifier with the individual hostname, may be substantially similar to the status identifiers and the association of status identifiers with hostnames as described herein with respect to FIGS. 1-3.

The associated status data (including the status identifier, and in some embodiments, the geographic accessibility information) for the individual hostname may be stored in a status database at block 303. The status database may be configured to store status data for a corresponding plurality of hostnames similar to status database 102 shown and described herein with respect to FIGS. 1-3. Once status data has been stored in the status database at method block 303, the status data can then be used in a variety of applications.

Figure 6B:
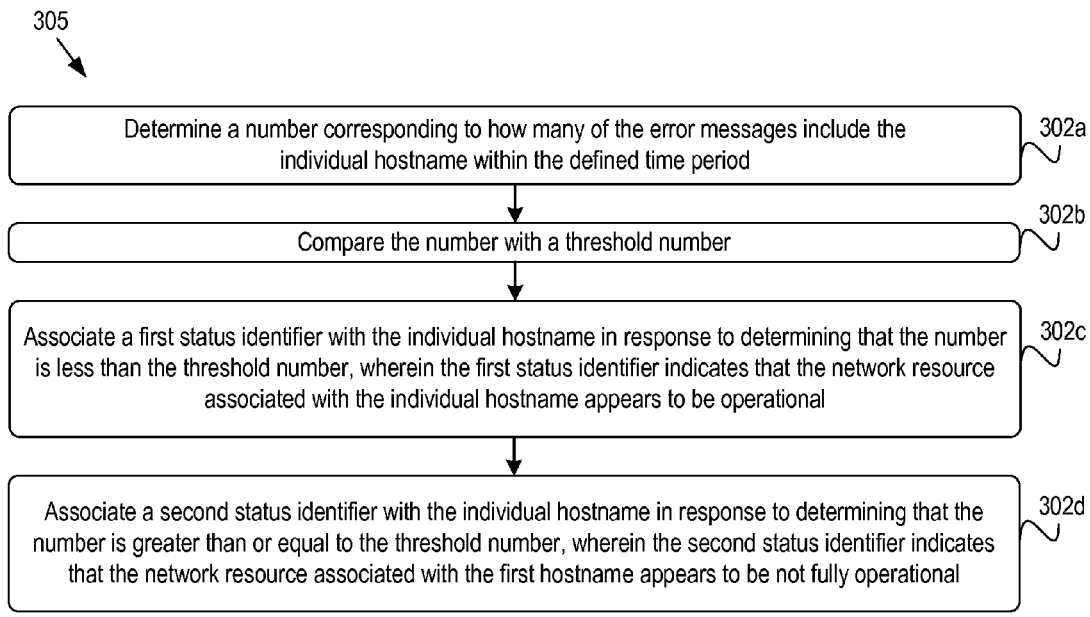

FIG. 6B illustrates a method 305 for associating a status identifier with a hostname according to one embodiment of block 302 shown in FIG. 6A. At block 302a, a number is determined. The number may correspond to how many of the error messages include the individual hostname have been received during the defined time period. A block 302b, the number determined in block 302a may be compared to a threshold number. In some embodiments, the threshold number may be based on at least one of a time of day, historical error rates associated with the first hostname, the number of errors in a previous time period, and a geographic region.

At block 302c, a first status identifier may be associated with the individual hostname in response to determining that the number determined in block 302a is less than the threshold number. The first status identifier may indicate that the network resource associated with the hostname appears to be operational.

At block 302d, a second status identifier may be associated with the hostname in response to determining that the number determined in block 302a is greater than or equal to the threshold. The second status identifier may indicate that the network resource associated with the hostname appears to be non-operational (or not fully operational).

Figure 6C:
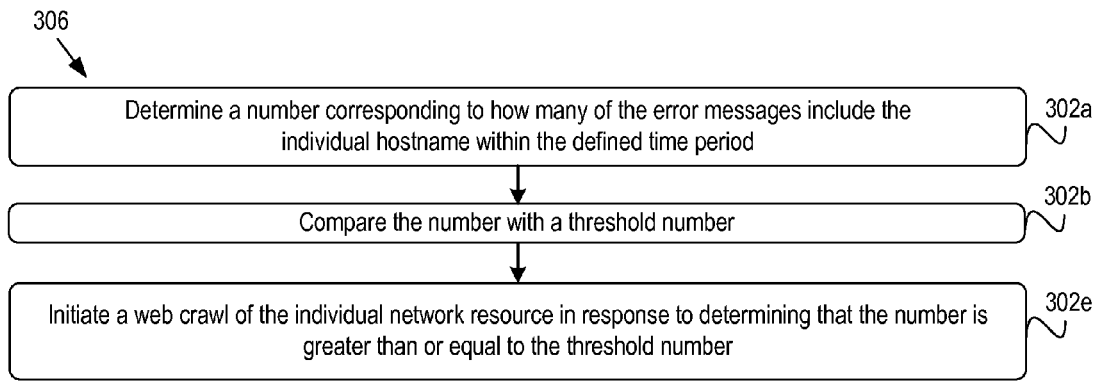

FIG. 6C illustrates a method 306 for associating a status identifier with a hostname according to another embodiment of block 302 shown in FIG. 6A. At block 302a, a number is determined. The number may correspond to how many of the error messages include the individual hostname that have been received during the defined time period. A block 302b, the number determined in block 302a may be compared to a threshold number. In some embodiments, the threshold number may be based on at least one of a time of day, historical error rates associated with the first hostname, the number of errors in a previous time period, and a geographic region.

At block 302e, a web crawl (or other form of electronic analysis as described elsewhere herein) of the individual network resource may be initiated in response to determining that the number determined in block 302a is greater than or equal to the threshold number. In some embodiments, the status data associated with the hostname corresponding to the individual network resource may be based at least in part on the result of the web crawl (or other analysis) of the individual network resource initiated in block 302e. For example, if the network resource is an Internet website, a web crawler could be used to analyze the Internet website to determine whether the website (and sometimes the Internet links contained therein) is operational and functioning properly. In this manner, the web crawler application may be able to determine that the website is operational, non-operational, at least partially operational, that certain portions of the website may be operational but that other portions of the website might be non-operational, or any combination thereof.

Figure 7:
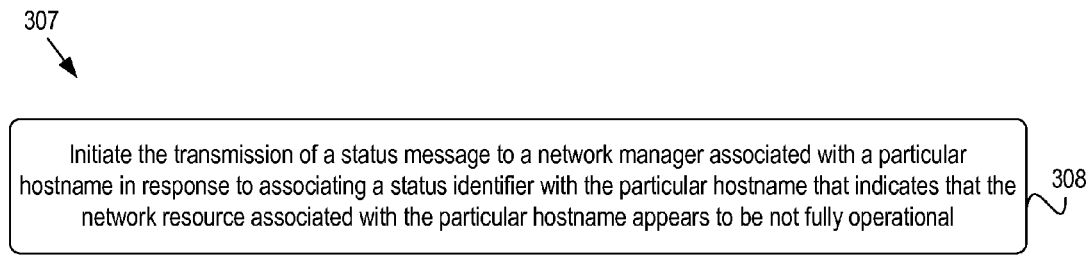

FIG. 7 illustrates a method 307 for initiating the transmission of a status message to a network manager associated with a particular hostname in response to associating a status identifier with the particular hostname in method block 302 of method 300 shown in FIG. 6A. For example, the status message may inform the network manager that a pattern of error messages received from multiple communications devices suggests that the particular network resource may be not fully operational.

Figure 8:
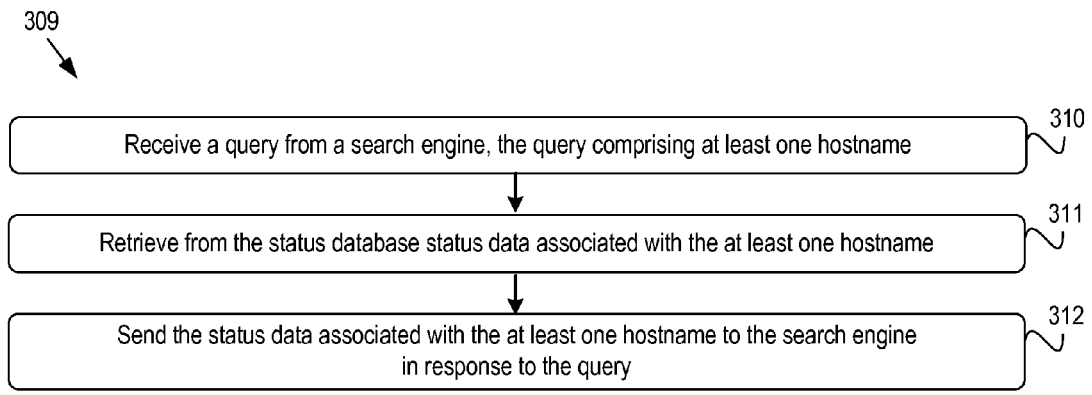

FIG. 8 illustrates a method 309 for using status data from a status database, such as status database 102, with a search engine, such as search engine 117, as shown and described herein. At method block 310, a query may be received from a search engine. The query from the search engine may include at least one hostname. The at least one hostname may be part of a group of search results generated by the search engine. At method block 311, status data associated with the at least one hostname may be retrieved from the status database. Then, at method block 312, the status data associated with the at least one hostname may be sent to the search engine in response to the query received in block 310.

The search engine may be configured to generate search results based at least in part on status data sent in block 312 in response to the query of block 310. For example, the search results associated with the at least one hostname may be displayed (and/or network links corresponding to the at least one hostname may be formatted) based at least in part on status data sent in block 312. Similarly, a link associated with a search result corresponding to the at least one hostname may be formatted to link the search result to either a network location (e.g., an Internet website or other type of network location) associated with the search result or to a cached version of the search result based at least in part on the status data sent in block 312.

Figure 9:
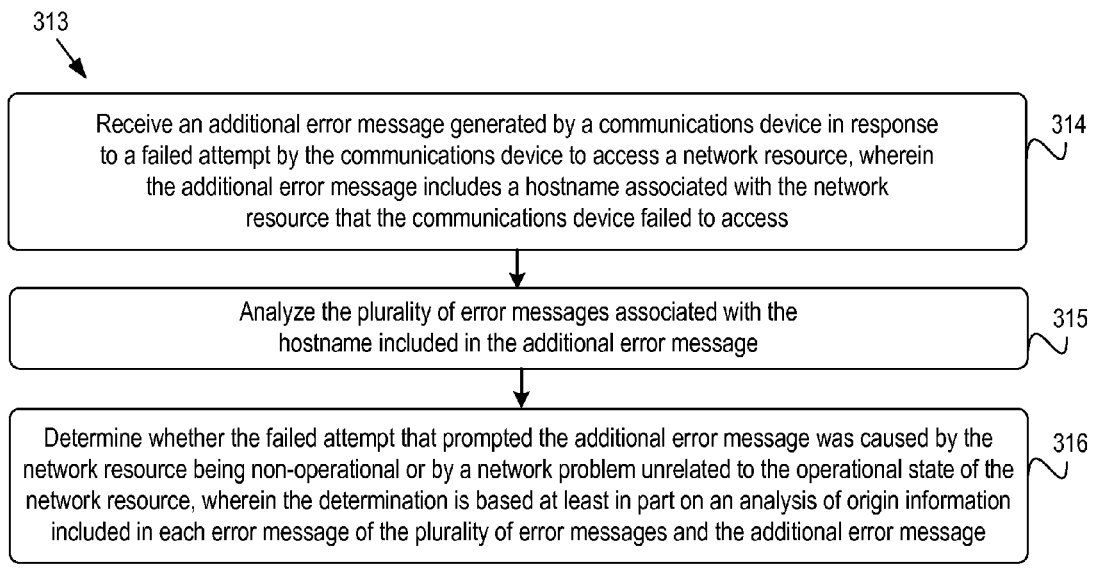

FIG. 9 illustrates method 313 for determining why a particular communications device may have been unable to access a particular network resource. As previously described, some individual error messages associated with a hostname may include origin information associated with the communications devices that generated the error messages, and the status data in the status database may include geographic accessibility information based on the origin information.

At method block 314, an additional error message may be received. The additional error message may have been generated by a communications device in response to a failed attempt by the communications device to access a network resource. The additional error message may include a hostname associated with the network resource that the communications device failed to access.

At block 315, the plurality of error messages associated with the hostname included in the additional error message may be analyzed. In some embodiments, analyzing the plurality of error messages may include analyzing origin information in the error messages associated with a particular hostname. Then, at block 316, a determination may be made as to whether the failed attempt that prompted the communications device to generate and send the additional error message may have been caused by the particular network resource being non-operational (or not fully operational) or by a network problem unrelated to the operational status of the particular network resource.

The determination made in method block 316 may be based on the analysis of origin information included in the error messages associated with the particular hostname as described herein with respect to FIGS. 1-3. In some embodiments, the geographic accessibility information contained in the status data may be based at least in part on the determination made in block 316.

In some embodiments, the system 100 may use geographic region-specific error rate thresholds in combination with the other general error rate thresholds described herein to determine whether a particular network resource may be operational but unreachable by users in a particular geographic area. For example, if a number of error messages associated with a particular network resource received during a particular time period that originated from a particular geographic region exceeds a geographic region-specific threshold, but the total number of errors does not exceed an overall error threshold (similar to the thresholds described elsewhere herein), then the system 100 may be able to infer that the network resource is operational but unreachable by users in the particular geographic region. Similarly, in other embodiments, if a number of received error messages for a particular network resource is less than a corresponding error threshold (similar to the thresholds described elsewhere herein), but a high enough percentage of the overall error messages for the network resource originated from communications devices located in particular geographic area, the system 100 may be able to infer that users in that particular geographic area may not be able to access that particular network resource even though the network resource may be otherwise operational (or at least partially operational) and accessible by users in other geographic areas.

Figure 10:
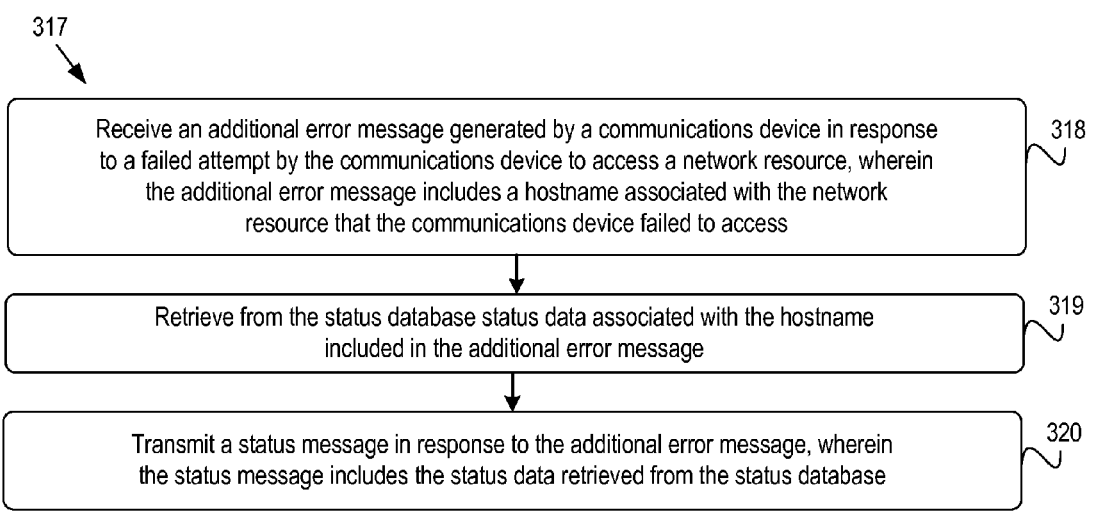

FIG. 10 illustrates a method 317 for using the status data stored in the status database for sending status messages regarding hostnames in response to receiving an error message. Method 317 may be used for informing a user about the status of a network resource. At block 318, an additional error message may be received from a communications device. The error message may have been generated by the communications device in response to a failed attempt by the communications device to access a desired network resource. The error message may be substantially similar to the error messages described elsewhere herein. For example, the additional error message may include a hostname associated with the network resource that the communications device failed to access.

At block 319, status data associated with the hostname included in the additional error message may be retrieved from the status database. Then, at block 320, a status message that includes at least some of the retrieved status data may be transmitted in response to receiving the additional error message. In some embodiments, the status message may be transmitted to the communications device that generated the additional error message. The status message may include information based on the status data associated with the hostname included in the error message received from the communications device. In some embodiments, the status message may include information based on either or both of the status identifier and the geographic accessibility information as described elsewhere herein.

In some embodiments, the disclosed methods and algorithms shown and described with respect to FIGS. 1-3, FIGS. 6A-6C, and FIGS. 7-10 may be implemented as computer program instructions encoded on a computer-readable media in a machine-readable format. FIG. 11 is a schematic illustrating a conceptual partial view of an example article of manufacture 400 that includes a computer program for executing a computer process on a computing device, arranged according to at least some embodiments described herein.

In some examples, the article of manufacture 400 may include a computer-readable medium 403, such as, but not limited to, a hard disk drive, a Compact Disc (CD), a Digital Video Disk (DVD), a digital tape, memory, etc. In some implementations, the article of manufacture 400 may encompass a computer recordable medium 404, such as, but not limited to, memory, read/write (R/W) CDs, R/W DVDs, etc.

The one or more programming instructions 402 may be, for example, computer executable and/or logic implemented instructions. In some examples, a computing device such as the computing devices shown and described in FIGS. 4-5 may be configured to provide various operations, functions, or actions to implement the features and functionality of the disclosed systems and methods in response to the programming instructions 402 conveyed to system engine 101 and/or the search engine 117 by one or more of the computer readable medium 403 or the computer recordable medium 404.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   receiving a plurality of error messages generated by a plurality of communications devices in response to failed attempts by the communications devices to access network resources, wherein each error message in the plurality of error messages includes a respective hostname associated with a particular network resource that a particular communications device failed to access;
   associating status data with individual hostnames included in the plurality of error messages, wherein the status data associated with an individual hostname is based at least in part on how many of the error messages include the individual hostname within a defined time period, and wherein the status data includes a status identifier that indicates an operational state of the network resource associated with the individual hostname;
   storing the status data associated with the individual hostnames in a status database;
   receiving an additional error message generated by a communications device in response to a failed attempt by the communications device to access a network resource, wherein the additional error message includes a hostname associated with the network resource that the communications device failed to access;
   retrieving from the status database status data associated with the hostname included in the additional error message; and
   transmitting a status message in response to the additional error message, wherein the status message includes the status data retrieved from the status database.

2. The method of claim 1, wherein the network resource is an Internet website, a network-based video service, a network-based music service, or a network-based gaming service.

3. The method of claim 1, wherein each error message in the plurality of error messages and the additional error message further include at least one of an error type, an origin associated with the communications device that generated the error message, and a timestamp associated with a time that the communications device generated the error message.

4. The method of claim 3, further comprising:
   analyzing the plurality of error messages to determine whether the failed attempt that prompted the additional error message was caused by the network resource being non-operational or by a network problem unrelated to the operational state of the network resource, wherein the determination is based at least in part on an analysis of origin information included in each error message of the plurality of error messages and the additional error message.

5. The method of claim 1, wherein associating status data with an individual hostname based at least in part on how many of the error messages include the individual hostname within the defined time period comprises:
   determining a number corresponding to how many of the error messages include the individual hostname within the defined time period;
   comparing the number with a threshold number;
   associating a first status identifier with the individual hostname in response to determining that the number is less than the threshold number, wherein the first status identifier indicates that the network resource associated with the individual hostname appears to be operational; and
   associating a second status identifier with the individual hostname in response to determining that the number is greater than or equal to the threshold number, wherein the second status identifier indicates that the network resource associated with the first hostname appears to be not fully operational.

6. The method of claim 5, wherein the threshold number is based on at least one of a time of day, historical error rates associated with the individual hostname, a number of errors in a previous time period, and a geographic region.

7. The method of claim 1, wherein associating status data with an individual hostname based at least in part on how many of the error messages include the individual hostname within the defined time period comprises:
   determining a number corresponding to how many of the error messages include the individual hostname within the defined time period, and comparing the number with a threshold number, and wherein the method further comprises:

initiating a web crawl of the individual network resource in response to determining that the number is greater than or equal to the threshold number.

8. The method of claim 1, further comprising:

initiating the transmission of a status message to a network manager associated with a particular hostname in response to associating a status identifier with the particular hostname that indicates that the network resource associated with the particular hostname appears to be not fully operational.

9. A method comprising:

receiving a plurality of error messages generated by a plurality of communications devices in response to failed attempts by the communications devices to access network resources, wherein each error message in the plurality of error messages includes a respective hostname associated with a particular network resource that a particular communications device failed to access;

associating status data with individual hostnames included in the plurality of error messages, wherein the status data associated with an individual hostname is based at least in part on how many of the error messages include the individual hostname within a defined time period, and wherein the status data includes a status identifier that indicates an operational state of the network resource associated with the individual hostname;

storing the status data associated with the individual hostnames in a status database;

receiving a query from a search engine, the query comprising at least one hostname;

retrieving from the status database status data associated with the at least one hostname; and sending the status data associated with the at least one hostname to the search engine in response to the query.

10. The method of claim 9, wherein the search engine is configured to display search results or format links associated with search results based at least in part on the status data associated with the at least one hostname.

11. The method of claim 9, wherein the search engine is configured to link a search result to either a network location associated with the search result or a cached version of the search result based at least in part on the status data associated with the at least one hostname.

12. A system comprising:

one or more communications interfaces configured to receive a plurality of error messages generated by a plurality of communications devices in response to failed attempts by the communications devices to access network resources, wherein each error message in the plurality of error messages includes a respective hostname associated with a particular network resource that a particular communications device failed to access;

one or more processors configured to associate status data with individual hostnames included in the plurality of error messages, wherein the status data associated with an individual hostname is based at least in part on how many of the plurality of error messages received within a defined time period include the individual hostname, and wherein the status data includes a status identifier that indicates an operational state of the network resource associated with the individual hostname;

a status database configured to store the status data associated with the individual hostnames; and wherein the one or more processors are further configured to (i) process an additional error message generated by a communications device in response to a failed attempt by the communications device to access a network resource, wherein the additional error message includes a hostname associated with the network resource that the communications device failed to access, (ii) retrieve from the status database status data associated with the hostname included in the additional error message, and (iii) initiate the transmission of a status message in response to the additional error message, wherein the status message is based on the status data retrieved from the status database.

13. The system of claim 12, wherein the network resource is an Internet website, a network-based video service, a network-based music service, or a network-based gaming service.

14. The system of claim 12, wherein each error message in the plurality of error messages and the additional error message further include at least one of an error type, an origin associated with the communications device that generated the error message, and a timestamp associated with a time that the communications device generated the error message.

15. The system of claim 14, wherein the one or more processors are further configured to determine whether the failed attempt that prompted the additional error message was caused by the network resource being non-operational or by a network problem unrelated to the operational state of the network resource, wherein the determination is based at least in part on origin information included in each error message of the plurality of error messages and the additional error message.

16. The system of claim 12, wherein the one or more processors are further configured to (i) determine a number corresponding to how many of the error messages include the individual hostname within the defined time period, (ii) compare the number with a threshold number, (iii) associate a first status identifier with the individual hostname in response to determining that the number is less than the threshold number, wherein the first status identifier indicates that the network resource associated with the individual hostname appears to be operational, and (iv) associate a second status identifier with the individual hostname in response to determining that the number is greater than or equal to the threshold number, wherein the second status identifier indicates that the network resource associated with the first hostname appears to be not fully operational.

17. The system of claim 16, wherein the threshold number is based on at least one of a time of day, historical error rates associated with the individual hostname, a number of errors in a previous time period, and a geographic region.

18. The system of claim 12, wherein the one or more processors are further configured to (i) determine a number corresponding to how many of the error messages include the individual hostname within the defined time period, (ii) compare the number with a threshold number, and (iii) initiate a web crawl of the individual network resource associated with the individual hostname in response to determining that the number is greater than or equal to the threshold number.

19. The system of claim 12, wherein the one or more processors are further configured to initiate the transmission of a status message to a network manager associated with a particular hostname in response to associating a status identifier with the particular hostname that indicates that the network resource associated with the particular hostname appears to be not fully operational.

20. A system comprising:
one or more communications interfaces configured to receive a plurality of error messages generated by a plurality of communications devices in response to failed attempts by the communications devices to access network resources, wherein each error message in the plurality of error messages includes a respective hostname associated with a particular network resource that a particular communications device failed to access;
one or more processors configured to associate status data with individual hostnames included in the plurality of error messages, wherein the status data associated with an individual hostname is based at least in part on how many of the error messages include the individual hostname within a defined time period, and wherein the status data includes a status identifier that indicates an operational state of the network resource associated with the individual hostname;
a status database configured to store the status data associated with the individual hostnames;
wherein the one or processors are configured to (i) process a query received from a search engine, the query comprising at least one hostname, (ii) retrieve from the status database status data associated with the at least one hostname, and (iii) send the status data associated with the at least one hostname to the search engine in response to the query.

21. The system of claim 20, wherein the search engine is configured to display search results or format links associated with search results based at least in part on the status data associated with the at least one hostname.

22. The system of claim 20, wherein the search engine is configured to link a search result to either a network location associated with the search result or a cached version of the search result based at least in part on the status data associated with the at least one hostname.

23. An article of manufacture including computer readable media with instructions stored thereon that, when executed by a processor, cause the processor to perform functions, the functions comprising:
receiving a plurality of error messages generated by a plurality of communications devices in response to failed attempts by the communications devices to access network resources, wherein each error message in the plurality of error messages includes a respective hostname associated with a particular network resource that a particular communications device failed to access;
associating status data with individual hostnames included in the plurality of error messages, wherein the status data associated with an individual hostname is based at least in part on how many of the error messages include the individual hostname within a defined time period, and wherein the status data includes a status identifier that indicates an operational state of the network resource associated with the individual hostname;
storing the status data associated with the individual hostnames in a status database;
receiving an additional error message generated by a communications device in response to a failed attempt by the communications device to access a network resource, wherein the additional error message includes a hostname associated with the network resource that the communications device failed to access;
retrieving from the status database status data associated with the hostname included in the additional error message; and
transmitting a status message in response to the additional error message, wherein the status message is based on the status data retrieved from the status database.

24. The article of manufacture of claim 23, wherein the network resource is an Internet website, a network-based video service, a network-based music service, or a network-based gaming service.

25. The article of manufacture of claim 23, wherein each error message in the plurality of error messages and the additional error message further include at least one of an error type, an origin associated with the communications device that generated the error message, and a timestamp associated with a time that the communications device generated the error message.

26. The article of manufacture of claim 25, the functions further comprising:
analyzing the plurality of error messages to determine whether the failed attempt that prompted the additional error message was caused by the network resource being non-operational or by a network problem unrelated to the operational state of the network resource, wherein the determination is based at least in part on origin information included in each error message of the plurality of error messages and the additional error message.

27. The article of manufacture of claim 23, wherein associating status data with an individual hostname based at least in part on how many of the error messages include the individual hostname within the defined time period comprises:
determining a number corresponding to how many of the error messages include the individual hostname within the defined time period;
comparing the number with a threshold number;
associating a first status identifier with the individual hostname in response to determining that the number is less than the threshold number, wherein the first status identifier indicates that the network resource associated with the individual hostname appears to be operational; and
associating a second status identifier with the individual hostname in response to determining that the number is greater than or equal to the threshold number, wherein the second status identifier indicates that the network resource associated with the first hostname appears to be not fully operational.

28. The article of manufacture of claim 27, wherein the threshold number is based on at least one of a time of day, historical error rates associated with the individual hostname, a number of errors in a previous time period, and a geographic region.

29. The article of manufacture of claim 23, wherein associating status data with an individual hostname based at least in part on how many of the error messages include the individual hostname within the defined time period comprises determining a number corresponding to how many of the error messages include the individual hostname within the defined time period, and comparing the number with a threshold number, the functions further comprising:
initiating a web crawl of the individual network resource in response to determining that the number is greater than or equal to the threshold number.

30. The article of manufacture of claim 23, the functions further comprising:
initiating the transmission of a status message to a network manager associated with a particular hostname in response to associating a status identifier with the particular hostname that indicates that the network resource associated with the particular hostname appears to be not fully operational.

31. An article of manufacture including computer readable media with instructions stored thereon that, when executed by a processor, cause the processor to perform functions, comprising:

receiving a plurality of error messages generated by a plurality of communications devices in response to failed attempts by the communications devices to access network resources, wherein each error message in the plurality of error messages includes a respective hostname associated with a particular network resource that a particular communications device failed to access;

associating status data with individual hostnames included in the plurality of error messages, wherein the status data associated with an individual hostname is based at least in part on how many of the error messages include the individual hostname within a defined time period, and wherein the status data includes a status identifier that indicates an operational state of the network resource associated with the individual hostname;

storing the status data associated with the individual hostnames in a status database;

receiving a query from a search engine, the query comprising at least one hostname;

retrieving from the status database status data associated with the at least one hostname; and sending the status data associated with the at least one hostname to the search engine in response to the query.

32. The article of manufacture of claim 31, wherein the search engine is configured to display search results or format links associated with search results based at least in part on the status data associated with the at least one hostname.

33. The article of manufacture of claim 31, wherein the search engine is configured to link a search result to either a network location associated with the search result or a cached version of the search result based at least in part on the status data associated with the at least one hostname.

* * * * *